United States Patent
Hirt et al.

(10) Patent No.: US 10,261,767 B2
(45) Date of Patent: Apr. 16, 2019

(54) DATA INTEGRATION JOB CONVERSION

(71) Applicant: TALEND, INC., Redwood City, CA (US)

(72) Inventors: Michaël Guillaume Maurice Hirt, Montigny-le-Bretonneux (FR); Ciaran Dynes, Wicklow (IE)

(73) Assignee: TALEND, INC., Suresnes (FR)

( * ) Notice: Subject to any disclaimer, the term of this patent is extended or adjusted under 35 U.S.C. 154(b) by 0 days.

(21) Appl. No.: 15/400,590

(22) Filed: Jan. 6, 2017

(65) Prior Publication Data

US 2018/0074803 A1  Mar. 15, 2018

Related U.S. Application Data

(60) Provisional application No. 62/395,183, filed on Sep. 15, 2016, provisional application No. 62/402,890, filed on Sep. 30, 2016.

(51) Int. Cl.
| | |
|---|---|
| *G06F 9/45* | (2006.01) |
| *G06F 8/51* | (2018.01) |
| *G06F 9/48* | (2006.01) |
| *G06F 9/54* | (2006.01) |

(52) U.S. Cl.
CPC .............. *G06F 8/51* (2013.01); *G06F 9/4806* (2013.01); *G06F 9/541* (2013.01)

(58) Field of Classification Search
CPC ............................... G06F 9/541; G06F 9/4806
USPC .......................................................... 717/139
See application file for complete search history.

(56) References Cited

U.S. PATENT DOCUMENTS

| | | | |
|---|---|---|---|
| 2005/0071842 A1* | 3/2005 | Shastry | G06F 9/5038 718/100 |
| 2005/0243604 A1 | 11/2005 | Harken et al. | |
| 2005/0256892 A1 | 11/2005 | Harken | |
| 2007/0127064 A1 | 6/2007 | Kuroshima | |
| 2008/0046715 A1* | 2/2008 | Balazs | G06F 21/41 713/152 |
| 2012/0084778 A1* | 4/2012 | Mall | G06F 9/3851 718/1 |
| 2014/0281708 A1* | 9/2014 | Adam | G06F 11/1443 714/18 |
| 2015/0154011 A1 | 6/2015 | Ceng et al. | |
| 2016/0092049 A1 | 3/2016 | Leigh et al. | |

OTHER PUBLICATIONS

PCT/US2017/050796, International Search Report, dated Nov. 20, 2017, 13 pages.

\* cited by examiner

*Primary Examiner* — Chameli Das
(74) *Attorney, Agent, or Firm* — Patterson + Sheridan, LLP (57) ABSTRACT

Techniques for converting a data integration job from one framework to a target are disclosed herein. A conversion tool receives a data integration job comprising a plurality of components. Each component performs an assigned task. The first data integration job is of a given framework. The conversion tool receives a request to convert the data integration job to a data integration job of a target framework. In response to the request, the conversion tool converts the data integration job by determining whether, for each component of the data integration job, a corresponding component in the target framework is available. The conversion tool converts the components to corresponding components and stored the new data integration job in a data store.

20 Claims, 5 Drawing Sheets

DATA INTEGRATION JOB CONVERSION

CROSS-REFERENCE TO RELATED APPLICATIONS

This application claims benefit of U.S. Provisional Patent Application Ser. No. 62/395,183, filed Sep. 15, 2016, and of U.S. Provisional Patent Application Ser. No. 62/402,890 filed Sep. 30, 2016, each of which is incorporated herein by reference in its entirety.

BACKGROUND

Field

Embodiments of the present disclosure generally relate to data processing, and more specifically, to converting a processing job from one framework to another.

Description of the Related Art

An organization may process large amounts of data for various purposes, such as for analytics, inventory, and marketing. Big data can be statistically analyzed to determine trends that can inform decision-making by the organization. Typically, the organization may design data integration workflows (also referred to herein as "jobs") comprising tasks for combine data from a variety of sources into a unified view of the data. For example, an extract-transform-and-load (ETL) job generally takes, as input, a set of data from homogeneous or heterogeneous sources, formats the data for subsequent analysis, and stores the data in a target data store.

As data integration technology has progressed, many different frameworks for processing large amounts of data have become available. For example, MapReduce is a programming model that processes large data sets in parallel using a combination of Map and Reduce functions on a given data set to produce a useful set of data for analysis. As another example, some cluster computing frameworks may ingest data in mini-batches and perform resilient distributed dataset (RDD) transformations on those mini-batches.

A developer may choose a framework that is appropriate for a desired data integration job, considering factors such as fastest processing time given the type of data, complexity of the job, and amount of data. However, given the disparate amount of frameworks available for processing large amounts of data, a developer might not be immediately certain of which framework to use. For example, for a given data integration job, a standard Java framework might yield results faster than if performed using a MapReduce framework. Or given a size of the underlying data, a batch streaming job might best use resources efficiently to process the data.

Consequently, the developer may desire to experiment with different frameworks for a given data integration job. However, the developer may be required to manually create the job for each framework. Further, a developer may want to migrate a data integration job from one system to another, whether the system executes jobs under a different framework. Therefore, the developer would need to recode the job using that framework. Because each framework may have disparate underlying components, a data integration job in one framework will have different complexities relative to the same data integration job in another framework. As a result, re-creating a data integration job in another framework can be a time-intensive and error prone process.

SUMMARY

One embodiment presented herein describes a method for converting a data integration job from a source framework to a target framework. The method generally includes receiving a request to convert a first data integration job of a first framework to a second data integration job of a second framework. The first data integration job comprises a plurality of components. Each component performs an assigned task as part of the first data integration job. In response to the request, the method generally performs the following steps for each component of the first data integration job: determining whether a component in the second framework that corresponds to the component in the first data integration job is available. If so, a converted component to include in the second data integration job is generated. If not, the component is flagged for review. The second data integration job is stored in a data store.

Another embodiment presented herein describes a computer-readable storage medium storing instructions, which, when executed on a processor, performs an operation for converting a data integration job from a source framework to a target framework. The operation itself generally includes receiving a request to convert a first data integration job of a first framework to a second data integration job of a second framework. The first data integration job comprises a plurality of components. Each component performs an assigned task as part of the first data integration job. In response to the request, the operation generally performs the following steps for each component of the first data integration job: determining whether a component in the second framework that corresponds to the component in the first data integration job is available. If so, a converted component to include in the second data integration job is generated. If not, the component is flagged for review. The second data integration job is stored in a data store.

Yet another embodiment presented herein describes a system having a processor and a memory. The memory stores program code, which, when executed on the processor, performs an operation for converting a data integration job from a source framework to a target framework. The operation itself generally includes receiving a request to convert a first data integration job of a first framework to a second data integration job of a second framework. The first data integration job comprises a plurality of components. Each component performs an assigned task as part of the first data integration job. In response to the request, the operation generally performs the following steps for each component of the first data integration job: determining whether a component in the second framework that corresponds to the component in the first data integration job is available. If so, a converted component to include in the second data integration job is generated. If not, the component is flagged for review. The second data integration job is stored in a data store.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein disclose techniques for converting a data integration job from one framework (e.g., a standard Java framework, a MapReduce framework, a batch processing framework, etc.) to another framework. Embodiments provide an integrated development environment (IDE) application that allows a developer to design a data integration job comprising a number of tasks for receiving a set of input data, processing the data, and generating output based on the processed data.

In one embodiment, the IDE application provides a conversion tool that uses a unified job definition model to translate underlying source code, graphical flow descriptions, and connection metadata between data integration jobs of a given framework to jobs of another framework. The unified job definition model may include definitions for a variety of frameworks, such as a standard Java, MapReduce, batch processing, and stream processing frameworks.

As further described below, the conversion tool may convert data integration jobs using the job definition model. For example, the conversion tool may analyze each component of an input job against the job definition model. The conversion tool identifies a corresponding component of a target framework. If identified, the conversion tool translates that component to the corresponding component.

Figure 1:
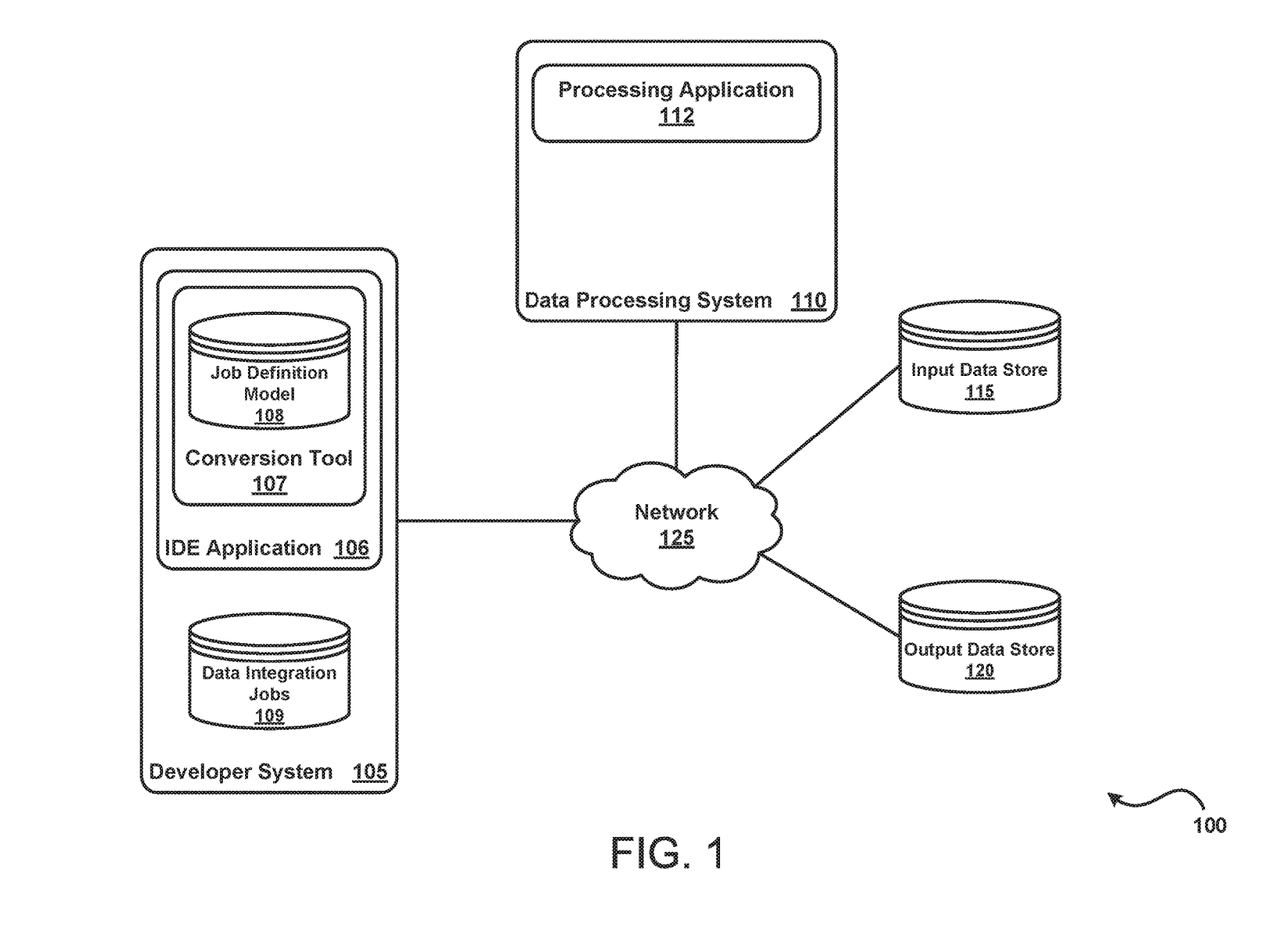
FIG. 1 illustrates an example computing environment, according to one embodiment.

FIG. 1 illustrates a computing environment 100, according to one embodiment. As shown, the computing environment 100 includes a developer system 105, a data processing system 110, an input data store 115, and an output data store 120, each interconnected via a network 125, e.g., the Internet.

Generally, the data processing system 110 includes a processing application 112. The processing application 112 performs a data integration job that includes a variety of tasks to be performed as a workflow for retrieving data from the input data store 115 (and other sources of data), processing the data (e.g., transforming the data to be further analyzed), and loading the processed data into the output data store 120. For example, the data integration job may be an extract-transform-and-load (ETL) processing job performed under some data processing framework, such as MapReduce.

In one embodiment, a developer may design a data integration job to be performed by the processing application 112. In particular, the developer system 105 includes an IDE application 106 that allows the developer to design data integration jobs 109. For instance, the IDE application 106 may provide a graphical user interface (GUI) that includes a canvas for a given data integration job. The developer may drag graphical representations of design components and connectors onto the canvas to create a given data integration job 109.

Each component performs and underlying function associated with that component. For example, a component for a file input path may include source code that retrieves a file input path in the data integration job 109. The developer may link a given component with another component to create a flow for the data integration job 109. Jobs created under the IDE application 106 are stored under a modeling framework. The modeling framework stores information relating to a given data integration job 109, such as a graphical flow description and connection metadata.

The IDE application 106 supports a variety of data processing frameworks. Example frameworks include Java, Apache Hadoop, Apache Spark, and the like. When creating a data processing job 109, the developer may select one of the frameworks, and in turn, the IDE application 106 retrieves components and connectors that are associated with that framework. In some cases, a developer may desire to port a given data integration job 109 of one framework (e.g., MapReduce) to a corresponding data integration job 109 of another framework (e.g., Apache Spark).

To do so, the IDE application 106 includes a conversion tool 107 that automatically converts the data integration job 109 to various frameworks. For example, the developer may access the conversion tool 107 through the GUI and select the desired data integration job 109 of a particular data processing framework. The developer may also select a target framework to which to convert the data integration job 109. In one embodiment, the conversion tool 107 includes a job definition model 108 that is a unified model which provides definitions (e.g., class and object definitions) for each component of all supported frameworks. The job definition model 108 may map common definitions across frameworks to one another.

Figure 2:
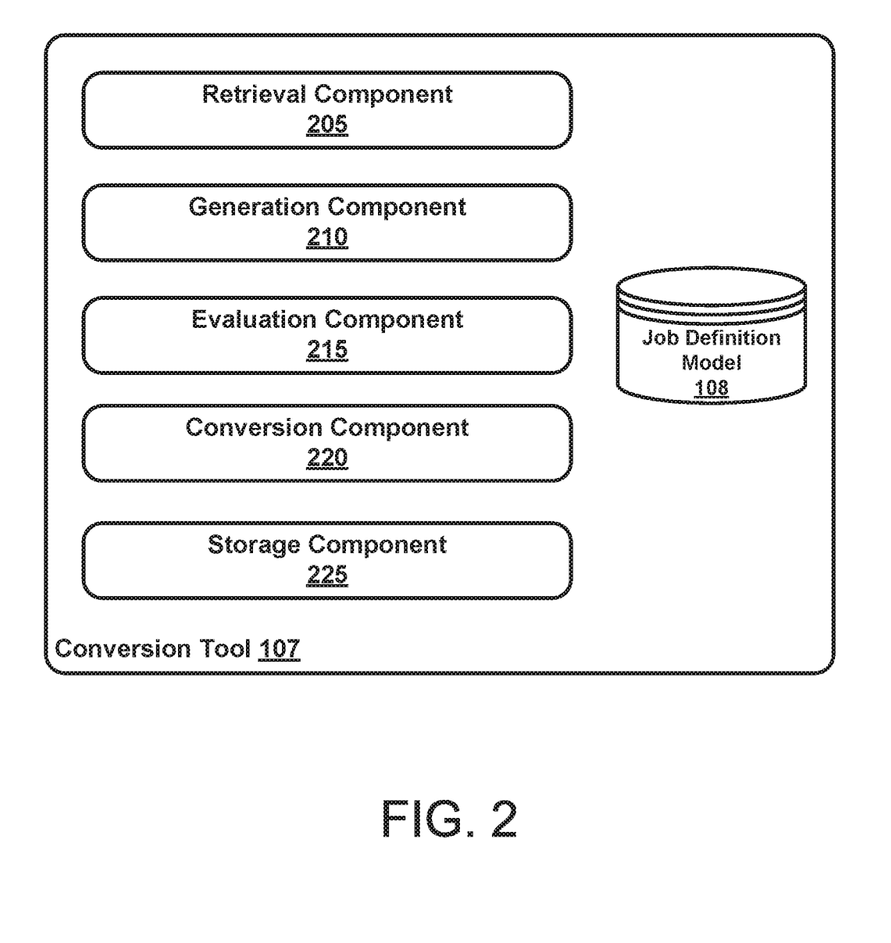
FIG. 2 illustrates a conceptual diagram of the conversion tool described relative to FIG. 1, according to one embodiment.

FIG. 2 illustrates a conceptual diagram of the conversion tool 107, according to one embodiment. As shown, the conversion tool 107 includes a retrieval component 205, a generation component 210, an evaluation component 215, a conversion component 220, a storage component 225, and the job definition model 108

Generally, the retrieval component 205 receives requests to convert a data integration job 109 from one framework to another framework. The retrieval component 205 may retrieve the data integration job 109 itself from a data store as well as the information relating to the job from the model framework of the IDE application 109. Such information can include a type of data integration job, underlying framework, graphical flow descriptions, connector metadata, and the like. The generation component 210 initializes a new data processing job 109 file that includes the content provided in the original data integration job 109. The generation component 210 may update the properties of the file such that the framework metadata specifies the target framework.

The evaluation component 215 may analyze each of the components of the data integration job 109 to identify parameters, values, and variables specified in the component. Further, the evaluation component 215 may determine a corresponding component in the target framework for the purpose of conversion. For example, a tFileInputDelimited component in a standard data integration framework may correspond to a tFileInputDelimited component in Apache Spark.

Further, the evaluation component 215 may evaluate any additional translation policies to identify whether any special conversions should be made to the component. For example, a tRedshiftConnection component (for initiating a Redshift JDBC connection to a server) in a standard data integration job might not ordinarily have a corresponding component in Apache Spark. A policy instead may specify that the tRedShiftConnection should be converted to a tRedshiftConfiguration component in Apache Spark.

The evaluation component 215 may also determine that a corresponding component is not available for a given component in the data integration job 109.

The conversion component 220 receives results for a given analyzed component in the evaluation component 215. The conversion component 220 may then copy variables, values, and the like from the original component to the corresponding component. The conversion component 220 may also retrieve a corresponding graphical representation of that component for presentation in the GUI. In the event that the evaluation component 215 is unable to identify a corresponding component, the conversion component 220 may flag the underlying component for a review by the developer. In turn, the developer may determine an appropriate component to use for the target framework. For example, in response to flagging the underlying component for review, the IDE application 106 may present the flagged component via a graphical user interface to the developer. In turn, the developer may evaluate the flagged component to determine the appropriate component. Once determined, the developer may specify the corresponding component via the IDE application 106, which in turn receives the specification and converts the component to the specified component.

The storage component 225 saves the resulting data integration job 109 to a data store, e.g., a local disk on the developer system 105, a cloud storage location, etc. In addition, the developer may view the resulting data integration job 109 via the GUI of the IDE application 106 and make any further modifications (e.g., to components flagged by the conversion component 220).

Figure 3:
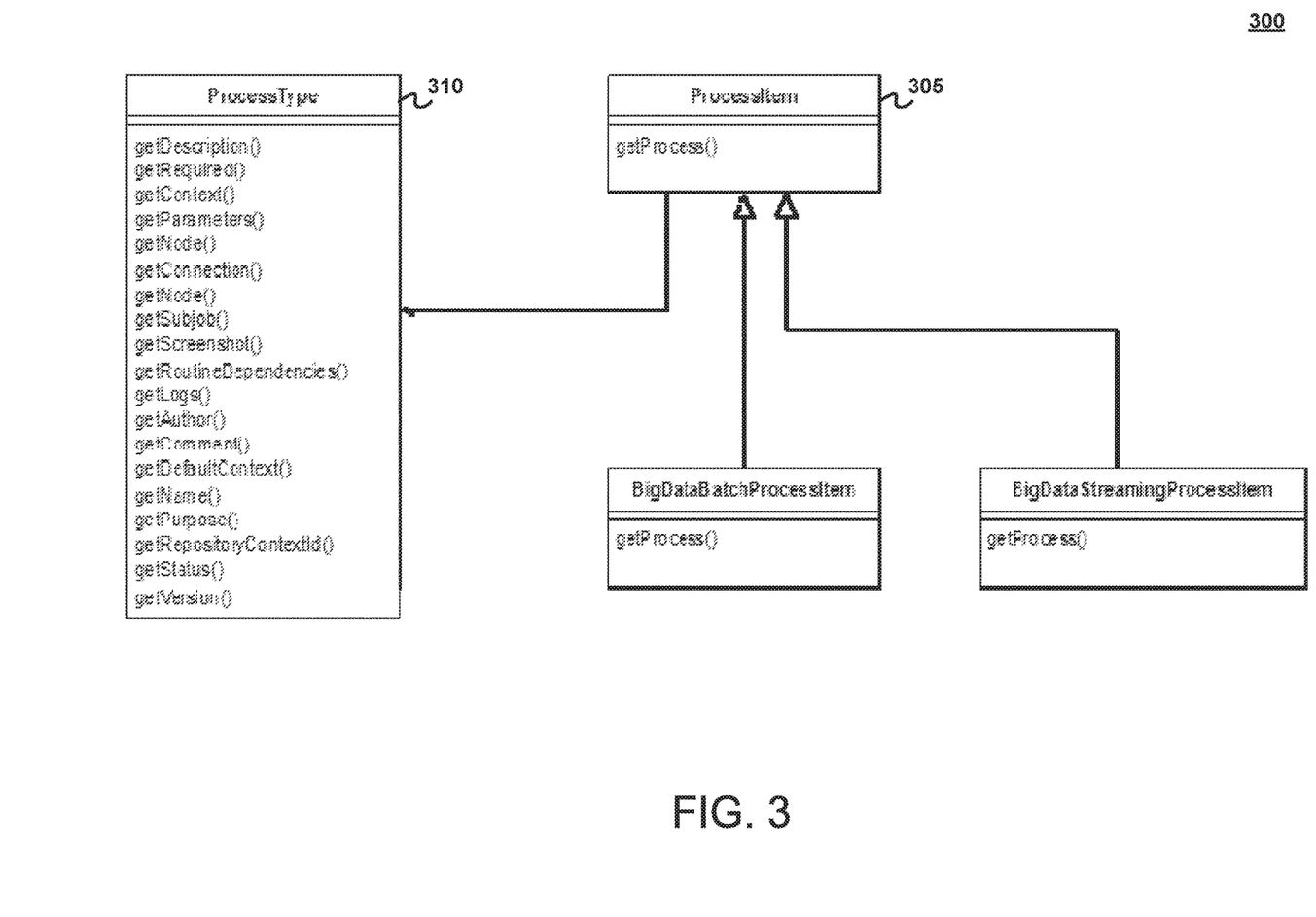
FIG. 3 illustrates a conceptual diagram of a universal job definition model, according to one embodiment.

FIG. 3 illustrates a conceptual diagram of an example universal job definition model 300, according to one embodiment. The IDE application 106 includes a universal job definition model that can be translated into a variety of runtimes. For example, this can include a standard job in Java, a MapReduce job, a Spark Batch job, a Spark streaming job, and a Storm job in Java.

In one embodiment, the IDE application 106 uses a modeling framework (e.g., an Eclipse Modeling Framework) to store information related to a given job. Such information includes a graphical flow description, connection metadata, and the like. The modeling framework allows the IDE application to save and restore models as jobs. In the modeling framework, jobs are generally based on a main class called ProcessItem, as illustrated at 305.

Big Data Batch jobs are based on a modeling framework class called MapReduceProcessItem, which extends the ProcessItem class. The definition of the job is contained in the ProcessType object (which is illustrated at 310). Big Data streaming jobs are based on the modeling framework class called StormProcessItem, which extends the ProcessItem class. The definition of the job is contained in the ProcessType object 310.

Note, when any job is converted, by default, the setup of components remains the same in that all variables are maintained. Thus, the main change takes place in the class containing the components. A job is composed of a sequence of directed acyclic graphs called subjobs. Subjobs may contain multiple components.

Figure 4:
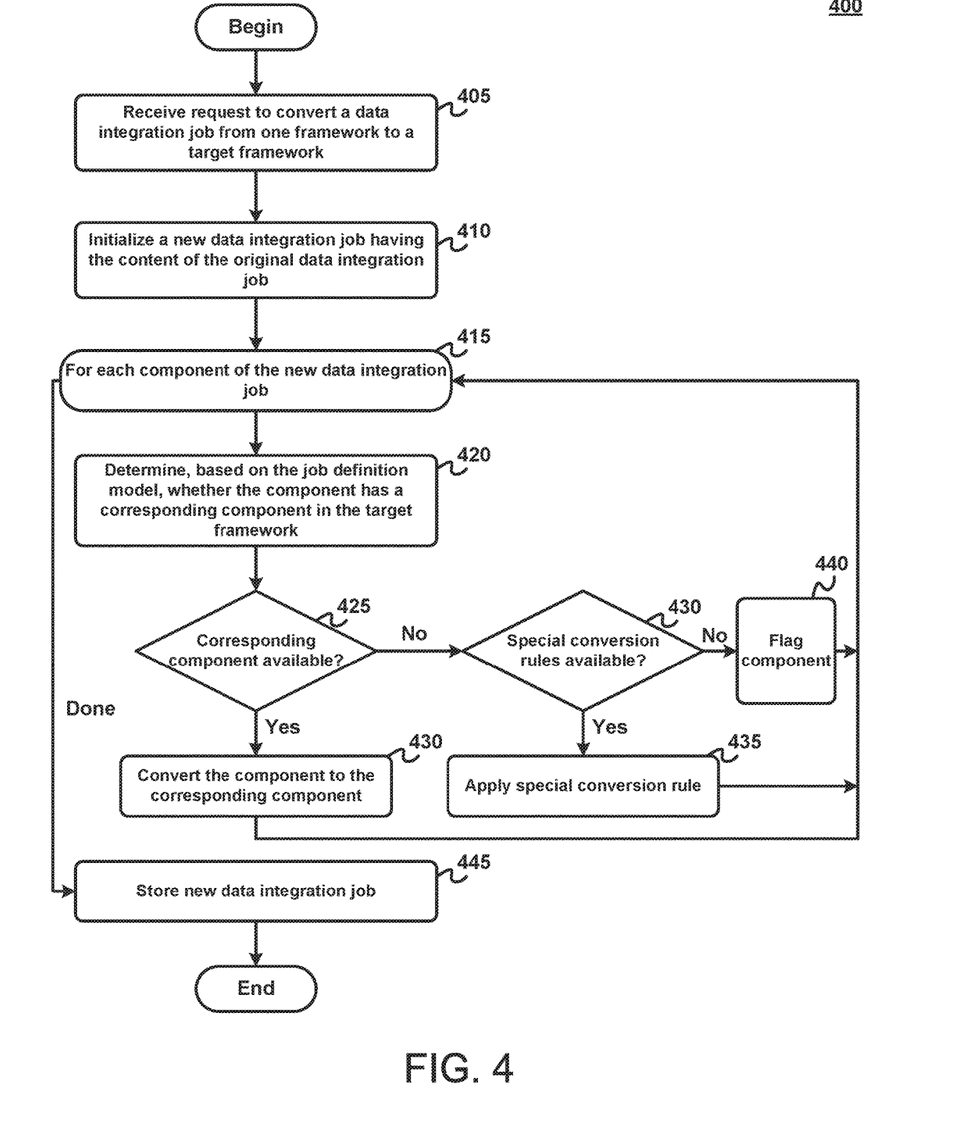
FIG. 4 illustrates a method for converting a data integration job of a given framework to a data processing job of another framework, according to one embodiment.

FIG. 4 illustrates a method 400 for converting a data integration job of a given framework to a data processing job of another framework, according to one embodiment. As shown, method 400 begins at step 405, where the retrieval component 205 receives a request to convert a data integration job from one framework to another. The request may include the data integration job file, metadata describing the underlying framework of the data integration job, and a target framework. For example, the request may specify converting the data integration job from a MapReduce framework to an Apache Spark framework. The retrieval component 205 may retrieve the data processing job 109 from storage as well as any metadata associated with the data processing job 109 stored in the model framework.

At step 410, the generation component 210 initializes a new data integration job file that includes the content (components, connectors, and the like) of the original data integration job. The generation component 210 may also specify (e.g., in metadata for the new file) that the data integration job file is of the target framework.

At step 415, the method 400 enters a loop for each component of the new data integration job. At step 420, the evaluation component 215 determines whether the component has a corresponding component in the target framework. The evaluation component 215 may do so by evaluating the job definition model 108. At step 425, the evaluation component 215 determines whether the corresponding component is available. The evaluation component 215 may send the result of the determination to the conversion component 220. If the corresponding component is available, then the conversion component 220 converts the original component to the corresponding component. The conversion component 220 may populate parameters for the component with variables and values retrieved from the original component.

If no corresponding component is available, then at step 430, the evaluation component 215 evaluates a translation policy to determine whether there are any special conversion rules available for that particular component. If so, then at step 435, the conversion component 220 applies the rule to that component. Otherwise, at step 440, the conversion component 220 may flag the component for review by the developer.

At step 445, the storage component 225 saves the new data integration job to a storage location (e.g., a local disk in the developer system 105, a cloud storage location, file server, etc.).

Figure 5:
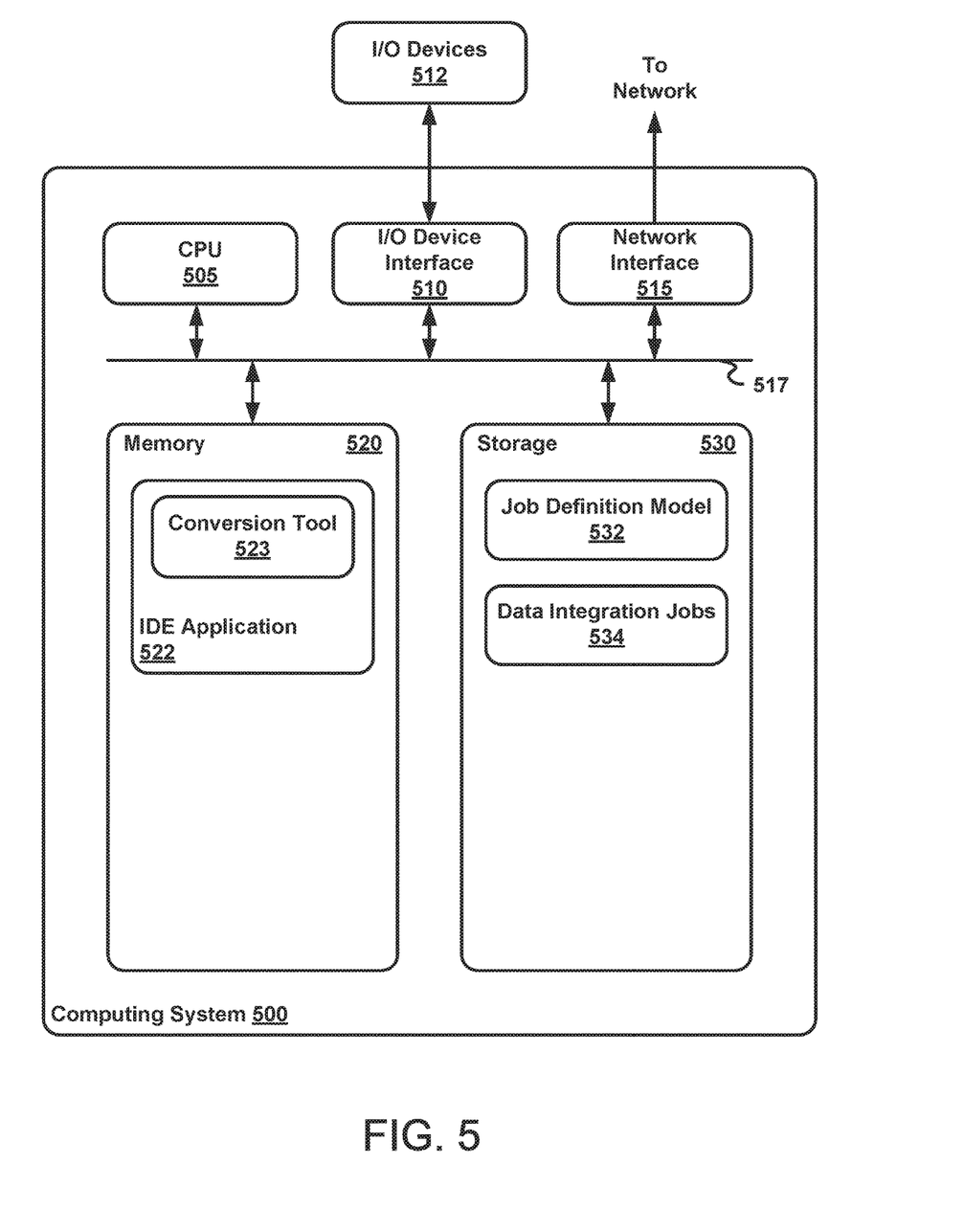
FIG. 5 illustrates an example computing system configured to convert a data processing job of a given framework to a data integration job of another framework, according to one embodiment.

FIG. 5 illustrates an example computing system 500 configured to convert a data processing job of a given framework to a data integration job of another framework, according to one embodiment. As shown, the computing system 500 includes, without limitation, a central processing unit (CPU) 505, a network interface 515, a memory 520, and storage 530, each connected to a bus 517. The computing system 500 may also include an I/O device interface 510 connecting I/O devices 512 (e.g., keyboard, mouse, and display devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 520. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes an IDE application 522. The storage 530 includes a job definition model 532 and one or more data integration jobs 534. The IDE application 522 itself includes a conversion tool 523 configured to convert a specified data integration job 534 from one framework to another. To do so, the conversion tool 523 may analyze individual components of the data integration job 534 against the job definition model 532. The job definition model 532 provides unified definitions for components of each framework. The conversion tool 523 may convert each component to a corresponding component in the framework or perform a special conversion according to rules in the event that a corresponding component is not present. The resulting data integration job 534 generally maintains its original flow structure.

One embodiment of the present disclosure is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the present disclosure. However, it should be appreciated that any particular program nomenclature that follows is used merely for convenience, and thus the present disclosure should not be limited to use solely in any specific application identified and/or implied by such nomenclature.

In sum, embodiments presented herein disclose techniques for converting a data integration job from one framework to another framework. Advantageously, such conversion allows a developer to port a complex data integration job to other frameworks with relatively little effort. Doing so provides the developer with multiple options for determining which framework to use in deploying a given job without needing to manually recode the same job in a different framework.

Additional examples of converting a data integration job of one framework to a data integration job of another framework are provided in the attached appendix.

While the foregoing is directed to embodiments of the present disclosure, other and further embodiments of the disclosure may be devised without departing from the basic scope thereof, and the scope thereof is determined by the claims that follow.

What is claimed is:

1. A method for converting a data integration job from a source framework to a target framework, the method comprising:
   receiving a request to convert a first data integration job of a first framework to a second data integration job of a second framework, the first data integration job comprising a plurality of job components, wherein each job component performs an assigned task as part of the first data integration job;
   in response to the request, determining that a corresponding component in the second framework that corresponds to a job component of the plurality of job components in the first data integration job is not available in a job definition model for the second framework;
   flagging the job component for review;
   in response to flagging the job component for review, receiving a specification of a target component of the second framework corresponding to the job component;
   generating a converted component based on the target component of the second framework;
   adding the converted component to the second data integration job; and
   storing the second data integration job in a data store.

2. The method of claim 1, further comprising, upon flagging the job component for review:
   presenting the job component via an application.

3. The method of claim 1, wherein generating the converted component based on the target component comprises:
   identifying one or more conversion rules associated with the corresponding component; and
   applying the identified one or more conversion rules to the corresponding component.

4. The method of claim 1, wherein the job definition model translates the first framework to the second framework.

5. The method of claim 1, wherein the request includes a file corresponding to the first data integration job, metadata describing the first framework, and a specification of the second framework.

6. The method of claim 1, further comprising:
   presenting the second data integration job via a graphical user interface;

receiving a selection of one or more modifications to at least a first component in the second data integration job; and converting the at least the first component based on the one or more modifications.

7. The method of claim 1, wherein generating the converted component based on the target component comprises:

populating parameters from the job component of the first data integration job in the converted component.

8. The method of claim 1, further comprising:

determining a policy conversion rule for the second framework applies to the job component;

identifying, based on the policy conversion rule, an alternate component of the second framework; and adding the alternate component to the second data integration job.

9. The method of claim 8, wherein the alternate component maintains parameters of the job component.

10. A computer-readable storage medium storing instructions, which, when executed on a processor, performs an operation for converting a data integration job from a source framework to a target framework, the operation comprising:

receiving a request to convert a first data integration job of a first framework to a second data integration job of a second framework, the first data integration job comprising a plurality of job components, wherein each job component performs an assigned task as part of the first data integration job;

in response to the request, determining that a corresponding component in the second framework that corresponds to a job component of the plurality of job components in the first data integration job is not available in a job definition model for the second framework;

flagging the job component for review;

in response to flagging the job component for review, receiving a specification of a target component of the second framework corresponding to the job component;

generating a converted component based on the target component of the second framework;

adding the converted component to the second data integration job; and storing the second data integration job in a data store.

11. The computer-readable storage medium of claim 10, wherein the operation further comprises, upon flagging the job component for review:

presenting the job component via an application.

12. The computer-readable storage medium of claim 10, wherein generating the converted component based on the target component comprises:

identifying one or more conversion rules associated with the target component; and applying the identified one or more conversion rules to the target component.

13. The computer-readable storage medium of claim 10, wherein the request includes a file corresponding to the first data integration job, metadata describing the first framework, and a specification of the second framework.

14. The computer-readable storage medium of claim 10, wherein the operation further comprises:

presenting the second data integration job via a graphical user interface;

receiving a selection of one or more modifications to at least a first component in the second data integration job; and converting the at least the first component based on the one or more modifications.

15. The computer-readable storage medium of claim 10, wherein generating the converted component based on the target component comprises:

populating parameters from the job component of the first data integration job in the converted component.

16. A system, comprising:

a processor; and a memory storing program code, which, when executed on the processor, performs an operation for converting a data integration job from a source framework to a target framework, the operation comprising:

receiving a request to convert a first data integration job of a first framework to a second data integration job of a second framework, the first data integration job comprising a plurality of job components, wherein each job component performs an assigned task as part of the first data integration job;

in response to the request, determining that a corresponding component in the second framework that corresponds to a job component of the plurality of job components in the first data integration job is not available in a job definition model for the second framework;

flagging the job component for review;

in response to flagging the job component for review, receiving a specification of a target component of the second framework corresponding to the job component;

generating a converted component based on the target component of the second framework;

adding the converted component to the second data integration job; and storing the second data integration job in a data store.

17. The system of claim 16, wherein the operation further comprises, upon flagging the job component for review:

presenting the job component via an application.

18. The system of claim 16, wherein generating the converted component based on the target component comprises:

identifying one or more conversion rules associated with the target component; and applying the identified one or more conversion rules to the target component.

19. The system of claim 16, wherein the operation further comprises:

presenting the second data integration job via a graphical user interface;

receiving a selection of one or more modifications to at least a first component in the second data integration job; and converting the at least the first component based on the one or more modifications.

20. The system of claim 16, wherein generating the converted component based on the target component comprises:

populating parameters from the job component of the first data integration job in the converted component.

* * * * *